US008412641B2

(12) United States Patent
Zeisset et al.

(10) Patent No.: US 8,412,641 B2
(45) Date of Patent: Apr. 2, 2013

(54) SURFACE AIR MANAGEMENT SYSTEMS AND METHODS

(75) Inventors: Kevin A. Zeisset, Pocahontas, IL (US); Harry W. Aldstadt, Woodbridge, VA (US); Janice Caldwell, Memphis, TN (US)

(73) Assignee: United States Postal Service, Washington, DC (US)

( * ) Notice: Subject to any disclaimer, the term of this patent is extended or adjusted under 35 U.S.C. 154(b) by 1941 days.

(21) Appl. No.: 10/632,934

(22) Filed: Aug. 1, 2003

(65) Prior Publication Data
US 2004/0133438 A1 Jul. 8, 2004

Related U.S. Application Data

(60) Provisional application No. 60/428,624, filed on Nov. 22, 2002.

(51) Int. Cl.
*G06Q 30/00* (2012.01)
(52) U.S. Cl. .......................................... 705/330; 705/334
(58) Field of Classification Search ........................ 705/1
See application file for complete search history.

(56) References Cited

U.S. PATENT DOCUMENTS

| | | | | |
|---|---|---|---|---|
| 5,043,908 A | * | 8/1991 | Manduley et al. | 700/227 |
| 5,068,797 A | * | 11/1991 | Sansone et al. | 700/219 |
| 5,072,401 A | * | 12/1991 | Sansone et al. | 700/219 |
| 5,666,493 A | | 9/1997 | Wojcik et al. | 705/26 |
| 5,995,950 A | | 11/1999 | Barns-Slavin et al. | 705/402 |
| 6,078,889 A | | 6/2000 | Boucher et al. | 705/1 |
| 6,085,170 A | | 7/2000 | Tsukuda | 705/26 |
| 6,341,271 B1 | * | 1/2002 | Salvo et al. | 705/28 |
| 6,571,213 B1 | * | 5/2003 | Altendahl et al. | 705/1.1 |
| 7,251,612 B1 | * | 7/2007 | Parker et al. | 705/9 |
| 2002/0032573 A1 | * | 3/2002 | Williams et al. | 705/1 |
| 2003/0110142 A1 | * | 6/2003 | Sesek et al. | 705/404 |

OTHER PUBLICATIONS

NPL_SDB, Rothe Development Corporation, v US, CAFC No. 00-1171, Aug. 20, 2001, 29 pages.*
International Search Report for PCT/US03/24021, dated Apr. 9, 2004.

* cited by examiner

*Primary Examiner* — Paul Danneman
(74) *Attorney, Agent, or Firm* — Finnegan, Henderson, Farabow, Garrett & Dunner, LLP

(57) ABSTRACT

Systems and methods are provided for assigning mail items to carriers, comprising at least one server containing a mail assignment engine. The mail assignment engine is operative to receive delivery data from the mail processors, determine routes for delivery using the delivery data and a set of business rules, assign the mail items to carriers based on the determined routes, and transmit mail item assignment information to the mail processors. The mail assignment engine may determine the routes using a database including files for active, planned, and closed routes. The mail assignment engine may also use business rules, which may comprise cost consideration, delivery options, and route delay information.

61 Claims, 18 Drawing Sheets

SURFACE AIR MANAGEMENT SYSTEMS AND METHODS

RELATED APPLICATIONS

This application claims priority to U.S. Provisional Application Ser. No. 60/428,624, filed on Nov. 22, 2002, which is incorporated herein by reference.

DESCRIPTION

Technical Field

This invention relates to a system of assigning mail to various modes of transportation. More particularly the invention facilitates selecting the best mode for transportation of mail items based on distance, cost, and speed of delivery.

BACKGROUND

The U.S. Postal Service (USPS) transports over 680 million items of mail every day. These items could be a variety of things such as letters, packages, printed matters, and express mail. Generally, these items are received at, or picked up and brought to, a postal operations center. In the center, the mail items are placed in trays and containers and either sorted with an Air Contracting Data Collection System (ACDCS) or placed in trays and containers and transferred to the transport facility for sorting with the ACDCS. The ACDCS sorts and assigns the mail items to a transport mode for delivery. The process of selecting the mode of transportation from origin to destination is referred to as mail item assignment. The ACDCS only assigns mail items to air delivery modes. The ACDCS does not have the capability, nor can it be modified to have the capability, to perform dynamic assignments, based on a lowest cost service window. The ACDCS is a system for a mail facility to process mail and assign it to commercial air flights.

FIG. 1A provides an illustration of one of the current procedures for assigning mail items to delivery modes. In the illustrated procedure, mail items may be brought from a customer facility 102 to a postal operations center 104 and placed in trays or containers. In center 104, the trays and containers 106 are processed, based upon the types of mail items, and then placed with the outgoing mail from the center. However, before the outgoing mail items leave the center, the mail items may be sorted either manually or using the ACDCS.

If manual sorting is used, the mail items are separated into surface and air mail items. Then, clerks or mail handlers further separate the surface mail items and assign them to delivery trucks. The air mail items, on the other hand, after being manually separated, are either processed and assigned with the ACDCS at the postal operation center 104 and then transferred to the transportation facility 108 or are first transferred from the postal operation center 104 to the transportation facility 108 and then processed using the ACDCS. Thus, the mail items are either processed by the ACDCS at the postal operation center 104 or at the transportation facility 108 and then assigned to the appropriate flights at a mode of transportation 110.

FIG. 1B illustrates another current procedure for assigning mail items to delivery modes. This method is similar to the one illustrated in FIG. 1A, except for the fact that the mail items are not delivered by the individual customers to the postal operation center; therefore, the mail items are not grouped by customer. In this method, the groups of mail items that are collected in trays and containers 106 contain mail items from multiple customers and from collection boxes. Like the process described in FIG. 1A, the mail items are separated into surface and air mail items, and the air mail items are either processed and assigned with the ACDCS at the postal operation center 104 and then transferred to the transportation facility 108; or the mail items are first transferred from the postal operation center 104 to the transportation facility 108 and then processed using the ACDCS.

For efficient, cost effective operation, it is important for the USPS to select from a variety of transportation modes to assign the transportation mode that is the fastest, most cost effective, and properly suited for the type of mail item to be delivered. The variety of transportation modes may include tractor trailers, trains, ships, and commercial airlines or dedicated air transporters.

Therefore, there is a need for a system and method that meets the above identified criteria on a broad scale. The solution requires a network in which assignments may occur at various points in the mail item processing. For example, the mail item assignment may take place at the customer facility 102, postal operations center 104, a competitor's site, or transportation facility 108. The assignments at these facilities may be made based on a set of business rules that ensure that most efficient and cost effective mode of transportation is selected.

SUMMARY

Consistent with the principles of the present invention, a method and a computer-readable medium containing computer-executable instructions are provided for assigning mail items to delivery carriers. The method and computer-executable instructions comprise stages for receiving delivery data from mail processors, determining routes for delivery using the delivery data and a set of business rules, assigning the mail items to delivery carriers based on the determined routes, and transmitting mail item assignment information to the mail processors. The routes may be determined by processing active, planned, and closed routes, and the business rules may use cost consideration, delivery option, and delay information. The method and computer-executable instructions may also include stages for creating an assignment manifest, transmitting the assignment manifest to the delivery carriers, and tracking delivery of the mail items using performance management tools.

Consistent with the principles of the present invention, a system for assigning mail items to delivery carriers, comprising at least one server with a mail assignment engine. The mail assignment engine may be operative to: receive delivery data from the mail processors, determine routes for delivery using the delivery data and a set of business rules, assign the mail items to delivery carriers based on the determined routes, and transmit mail item assignment information to the mail processors. The mail assignment engine is further operative to create an assignment manifest for delivery to the carriers, and to provide performance management tools for tracking delivery of the mail items. The mail assignment engine may determine the routes using a database that includes files for active, planned, and closed routes. The mail assignment engine may also use business rules that may include cost consideration, delivery options, and route delay information.

Consistent with the principles of the present invention, a computer for tagging mail items comprises a software component for receiving delivery data, transmitting delivery data to a mail item assignment system, receiving an assignment data file from the mail item assignment system, and printing labels containing mail item routing information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE EMBODIMENTS

Figure 1A:
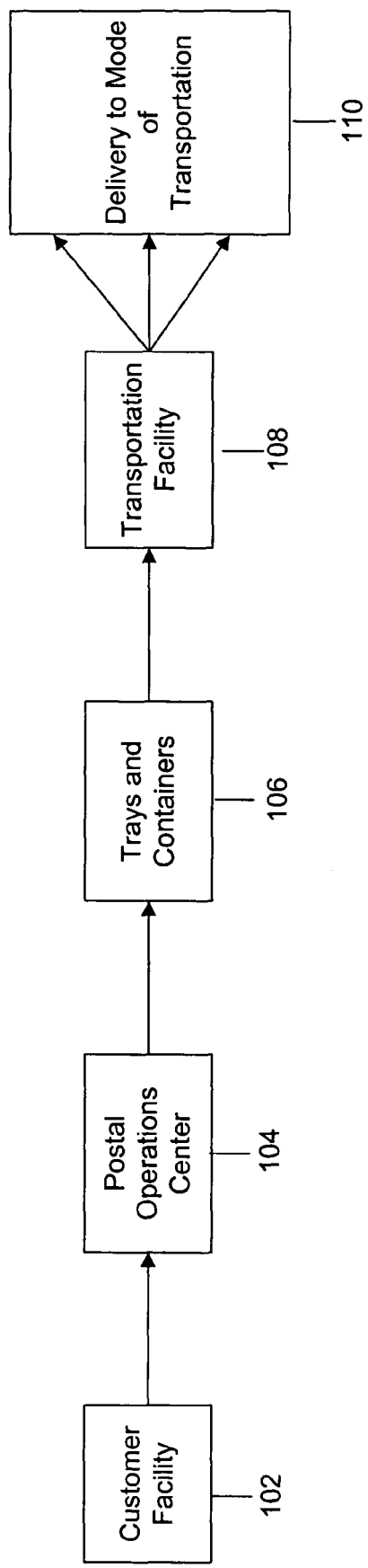
FIG. 1A provides an illustration of a current method for assigning mail items to delivery modes.
Figure 1B:
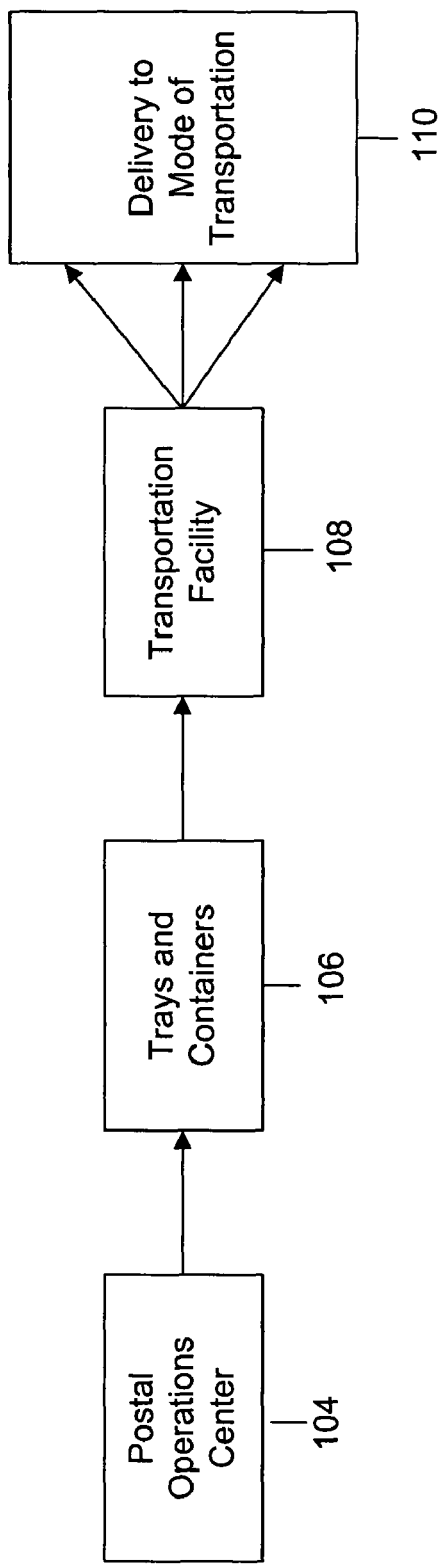
FIG. 1B provides an illustration of another current method for assigning mail items to delivery modes.

Reference will now be made in detail to exemplary embodiments, consistent with the principles of the present invention, which are illustrated in the accompanying drawings. Wherever possible, the same reference numbers will be used throughout the drawings to refer to the same or like parts.

Overview

In one embodiment consistent with the principles of the present invention, a Surface Air Management System (SAMS) may provide systems and methods for U.S. Postal Service assignments, whether the assignments are performed in customer facilities, a postal operation center, or some other location. SAMS may also provide a logical system with methods utilizing business rules for facilitating the transportation of mail items from origin to destination. Through these business rules, SAMS may provide the lowest possible rate for the delivery of mail items, meet the service window, and the cost specified to have the mail items delivered to a final destination. The transportation used in the assignment process may include a wide range of modes (e.g., commercial air, dedicated air, vehicles, tractor trailers, trains, and ships).

Generally, to initiate the implementation process, mail items arriving at a postal operations center may be sorted by destination and by mail item type (e.g., First Class Mail, surface mail, air mail, or Express Mail). The sorted mail items may be deposited in trays and/or containers and the address information from the mail items may be inputted into a computer equipped with a SAMS software component.

The SAMS software component may be software operated on a remote computer to transmit information to and receive information from SAMS. SAMS, on the other hand, may be a network of servers, with assignment engines, which determine the delivery routes and assign the mail items to a mode of transportation.

More specifically, the SAMS software component at a customer site or a postal processing center may be an electronic data component, which may comprise a series of files and instructions that may be received from SAMS. SAMS may communicate with the SAMS software component through a Transaction Concentrator (TC), which may comprise software integrated into SAMS's hardware components.

SAMS receives the address information from the SAMS software component and processes the information according to criteria established in software and creates an assignment data file, indicating the appropriate mode of transportation for that particular tray of mail items. The criteria that SAMS may consider in processing the trays of mail items may be, for example, the type of mail, the location of origin, and the distance to the destinations. In addition to the criteria, SAMS may also use a set of configurable business rules to optimize the postal delivery operations. These business rules may be dynamic because the rules may change due to changes in postal operations, such as new contracts with transporters, new laws, and new methods devise by the postal service to conduct business.

When SAMS completes the mail item assignment, SAMS transmits the assignment data file to the SAMS software component. The SAMS software component receives the assignment data file and creates distribution and routing (DNR) tags. The DNR tags are attached to the trays or containers and indicate the mode of delivery to be used. The DNR tags may also provide a barcode used for further downstream processing.

As mentioned above, SAMS may comprise a number of servers, which act as mail assignment engines. These servers may maintain data from various sources and may feed data to a mainframe. These servers may also have associated administrative terminals, where dynamic changes may be made to override certain tasks based upon unforeseen conditions.

In one embodiment consistent with the principles of the present invention, the servers may communicate with each other to coordinate the mail item assignments. This may be useful because geographically the servers may be assigning mail items to the same mode of transportation at the same location. Through these communications, the servers may make sure that the capacity of the mode of transportation is not exceeded.

The Transaction Concentrators (TCs), which control the assignment flow in particular areas, may also assist in assuring that the capacity of a particular mode of transportation is not exceeded. The TCs in a particular area may communicating with the server for a particular area and assure that the server does not overload the transportation mode serving the area.

SAMS, in addition to collecting the mail item information discussed above, collects information for billing purposes and for capacity planning. For example, a carrier such as a commercial airline may have a capacity of 1,000 pounds to carry USPS mail. SAMS computes the capacity of the assigned mail items until the limit for the assigned carrier is reached, and then assigns future shipments to the next flight or to a different mode of transportation based upon the capacity.

SAMS also collects and stores information from other applications to measure the performance of carriers who are assigned to carry mail items. SAMS may keep track of shipments and store information regarding the transportation path of the trays or containers that are in the system at any given time. The transportation path is divided into gates or locations. SAMS may measure the gates that the trays or containers pass through. The contract with the carriers may specify the time when the trays will be delivered at the destination. SAMS has the capacity to measure the time of delivery; and if the delivery is not made by the time specified in the contract with the carrier, the carrier may be paid less for the late delivery.

SAMS may also have the capabilities to receive route and dispatch information from carriers. With this information, SAMS may be able to monitor whether a route has been discontinued, delayed by weather, or some other change has occurred, and reassign mail items to another carrier or mode of transportation. SAMS may also receive scheduling and capacity changes from air carriers and send air carriers information about mail items assigned to flights by means of Electronic Data Interchange (EDI).

Furthermore, SAMS may also send payment information to the carriers and the USPS air carrier payment application, and provide instructions for limitation and/or capacity planning. SAMS collects data that may be fed to the financial systems of the USPS to quickly remit payment to the carrier. SAMS may also send a manifest to carriers giving the carriers information about the payment details for the assignments. Different carriers may be paid different rates for carrying the same weight of mail items. One of the reasons for this anomaly may be that SAMS keeps track of the delivery performance of the carriers and when a contract is negotiated with a carrier the past performance is reviewed, and a new rate is fixed accordingly. Therefore, carriers with better performance received higher rates.

As discussed above, in assigning mail items to carriers, SAMS may consider cost factors, mail type, the time of the day the mail items are assigned, weather conditions, delivery options, and delays. Taking these factors into account, SAMS may assign transportation to a variety of mail items using a multitude of carriers (e.g., rail roads, trucks, and airlines), to optimize the cost, speed, and capacity of mail item delivery.

System Operational Description

Figure 2:
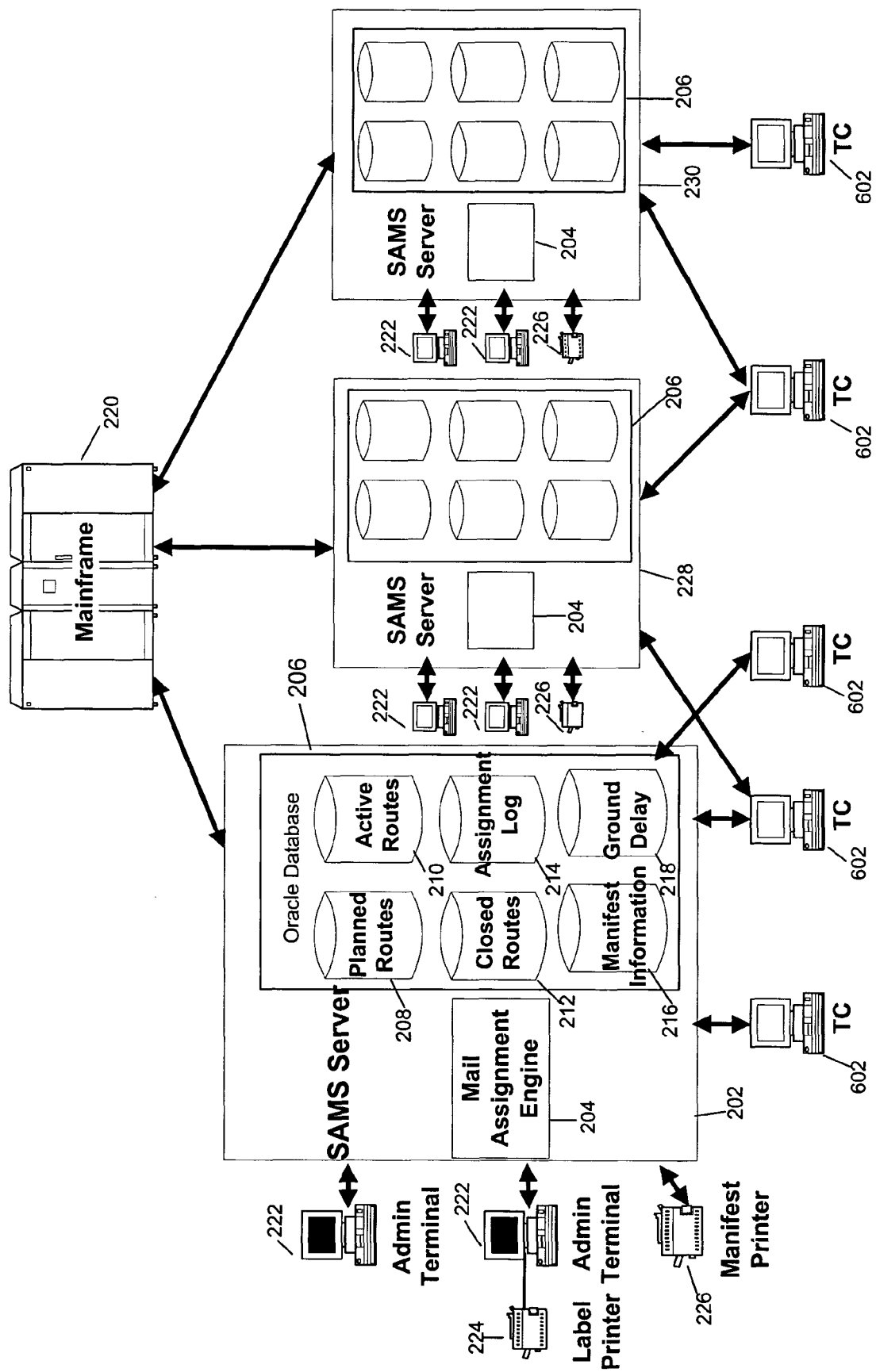
FIG. 2 provides an architectural system diagram of a Surface Air Management System (SAMS), consistent with the principles of the present invention.

FIG. 2 provides an architectural system diagram of a SAMS 200, consistent with the principles of the present invention. Within SAMS 200, a SAMS server 202 runs a mail assignment engine 204, which accesses files managed and maintained through a database 206, such as an Oracle database. Database 206 may comprise files 208, 210, 212, and 218 containing information relating to planned routes, active routes, closed routes, and ground delays, respectively. Database 206 may also contain an assignment log 214 and manifest information 216.

In one embodiment consistent with the principles of the present invention, mail assignment engine 204 may use the other information contained in database 206 to generate the information for assignment log 214 and manifest information 216.

SAMS server 202 may derive the information for ground delays 218 from information received through Electronic Data Interchange (EDI) communications with the various carriers. SAMS server 202 may also gather information for ground delay file 218, as well as files 208, 210, and 212 containing the information relating to planned routes, active routes, and closed routes, respectively, through external source(s) (not shown) communicating with SAMS server 202.

SAMS server 202 may also provide information to and receive information from a mainframe 220. Mainframe 220 may transmit the information received from SAMS server 202 to other applications and/or systems for payment, forecasting, management, or other business functions.

Furthermore, for the administration of SAMS 200, SAMS server 202 may interact with administration terminals 222, which may enable a system administrator to make dynamic changes and/or override parameters used in the assignment process. These terminals may have an attached label printer 224 and/or a manifest printer 226. Manifest printer 226 may also be directly connected to SAMS server 202, and may provide a hardcopy manifest, which assures the carriers of payment for the services provided. SAMS 200 may also provide an electronic manifest to carriers capable of handling such a communication.

As illustrated in FIG. 2, SAMS 200 may comprise a network of servers, such as SAMS servers 202, 228, and 230. SAMS servers 228 and 230, like SAMS server 202, may interact with administrative terminals 222, which may have attached label printers 224 and/or manifest printers 226.

Within the network, SAMS servers (202, 228, and 230) may communicate with each other to execute mail assignments, because within a particular geographical area individual SAMS server (202, 228, or 230) may be assigning mail items to the same carrier at a particular location. For example, SAMS servers (202, 228, and 230) located in three states (i.e., District of Columbia, Maryland, and Virginia) may be assigning mail items to carriers at Ronald Reagan National Airport in Washington, D.C. In such a situation, SAMS server (202, 228, or 230) for each of those states may communicate with each other to ensure that the carrier capacity is not exceeded, while applying their respective business rules. The communications between SAMS servers (202, 228, and 230) may be managed and facilitated under the hardware/software of transaction concentrators 602.

Figure 3A:
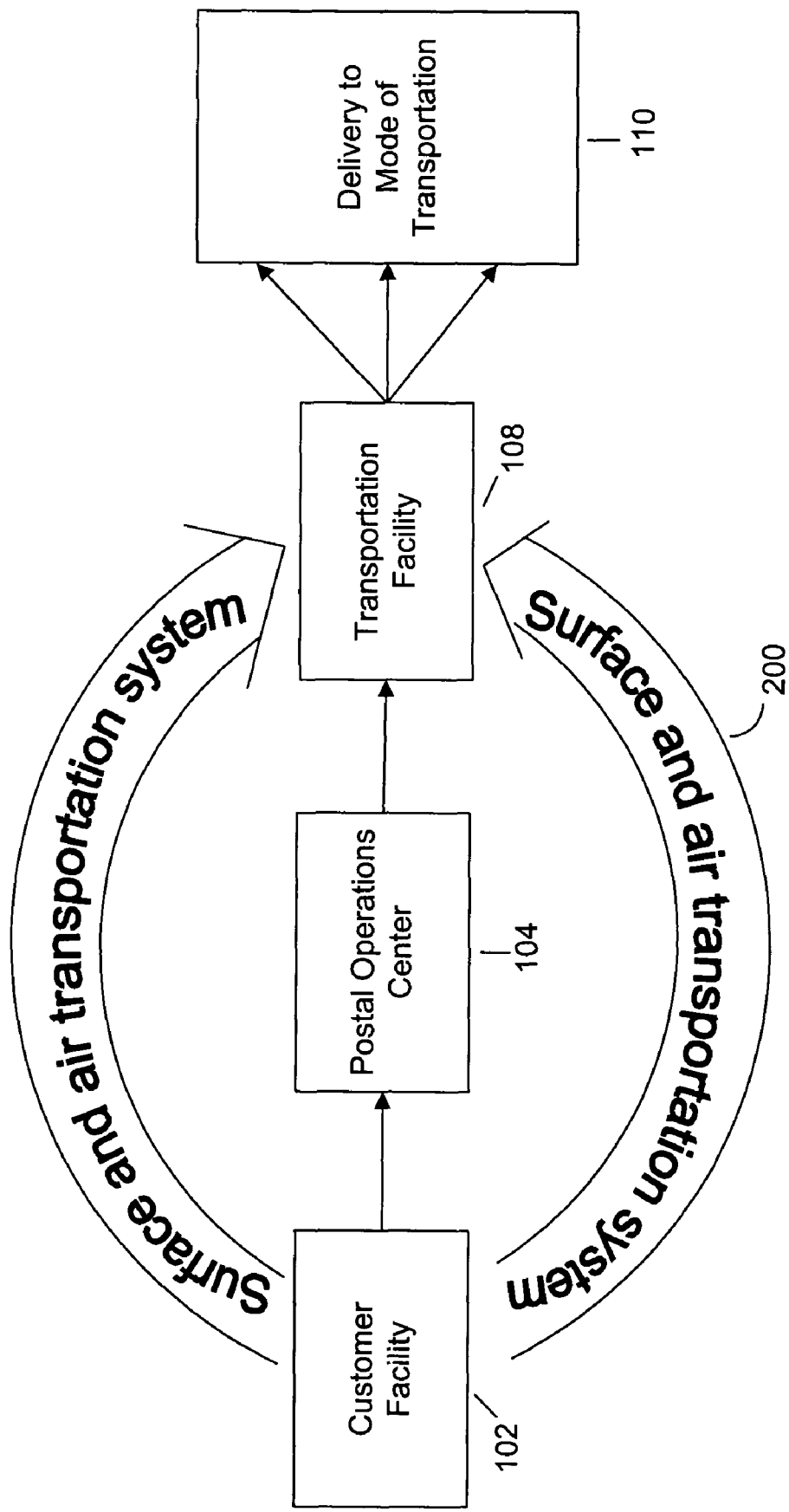
FIG. 3A provides an illustration of mail items being assigned to a mode of transportation at a customer facility and being directly taken to a transportation facility, consistent with the principles of the present invention.

Referring now to FIG. 3A, mail items may be assigned to a mode of transportation at a customer facility 102 and directly taken to a transportation facility 108. Mail items may be assigned at customer facility 102 via a software component residing in the customer's existing equipment or new equipment installed for this purpose, which may interface with SAMS 200. Using SAMS 200, the mail items bypass postal operations 104 and are provided directly to transportation facility 108, thereby avoiding the additional cost of processing the mail items at postal operation center 104. Transportation facility 108 may be a location where the mail items are cross-docked for delivery to mode of transportation 110.

Figure 3B:
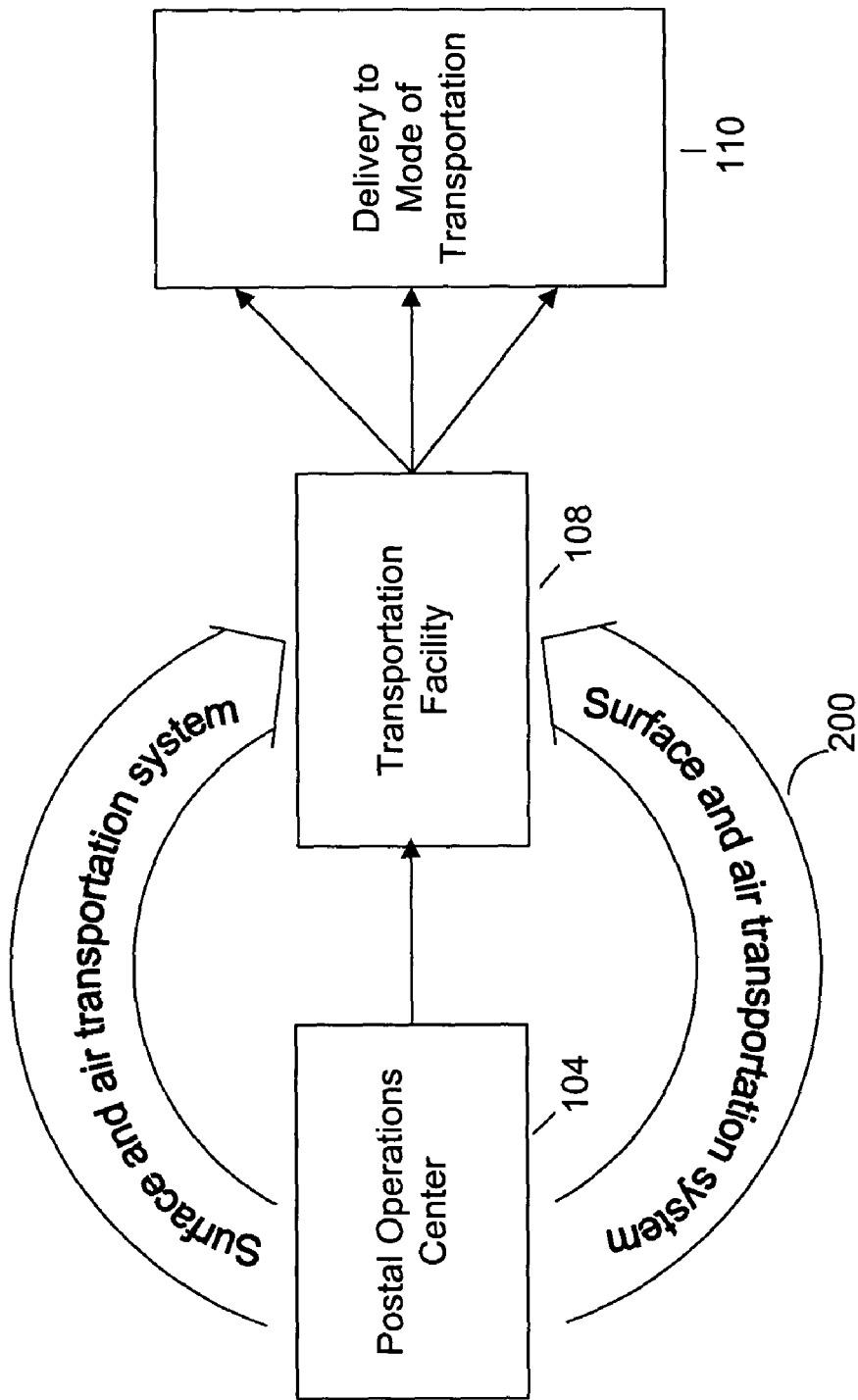
FIG. 3B provides an illustration of the SAMS being utilized to assign mail items from a postal operation center to a transportation facility, consistent with the principles of the present invention.

Referring now to FIG. 3B, SAMS 200 may be utilized to assign mail items from postal operation center 104 to transportation facility 108. SAMS 200 may enable mail items at postal operation center 104 to be assigned in a dynamic manner to the appropriate mode of transportation, create Distribution and Routing (DNR) tags, and apply the DNR tags to the trays or containers of mail items. From postal operation center 104, the mail items are directed to transportation facility 108 and are delivered to mode of transportation 110, which may include air, ship, railroad, or tractor trailer as a means of transportation. SAMS 200 may also enable mail items to be handled through seamless dispatch, where automated equipment process the mail items and transfer them directly to the transportation assignment equipment. Therefore, the need for the manual assignment of mail items may be eliminated.

Figure 4:
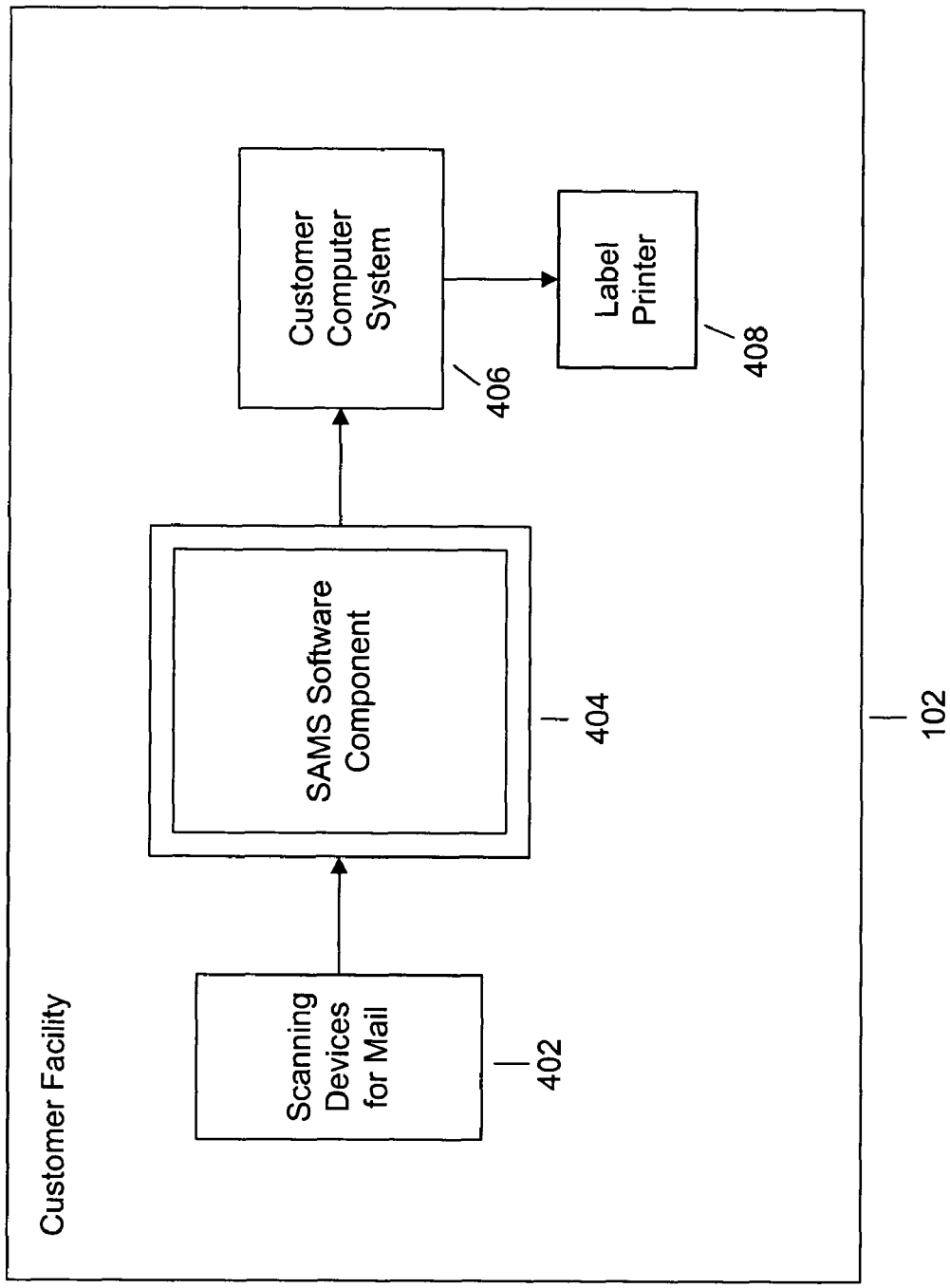
FIG. 4 provides an illustration of the equipment used to assign mail items at a customer facility, consistent with the principles of the present invention.

Referring now to FIG. 4, there is shown equipment, which may be used to assign mail items at customer facility 102. In order to implement the assignment, the customer may use scanning devices 402 or other equipment, which have the capability to assign mail in an automated or manual fashion. Scanning devices 402 may receive instructions from a SAMS component 404 or SAMS component 404 may feed information to scanning devices 402. SAMS component 404 may comprise an electronic component that supplies data files and receives data files from scanning device 402.

Once SAMS component 404 receives the identification information (e.g., the origin, the destination, and the type of mail item) from scanning devices 402, SAMS component 404 transfers the identification information to a customer computer system 406. Then, customer computer system 406 interacts with SAMS 200 and a print routine within customer computer system 406 to enable label printer 408 to print a label or DNR Tag. The label provides instructions and bar codes for processing the mail item trays downstream and identifies the transportation provider.

Figure 5:
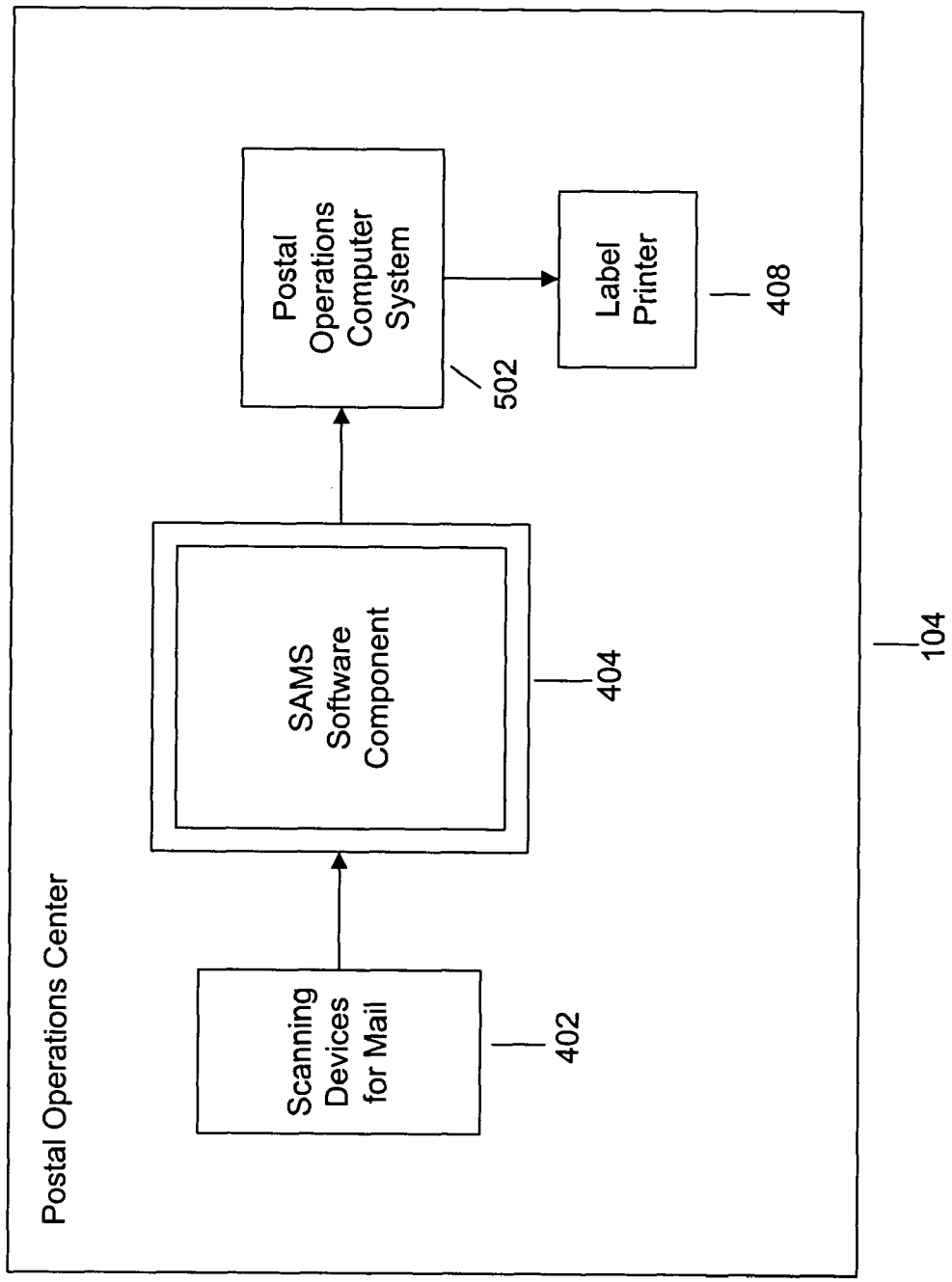
FIG. 5 provides an illustration of the equipment used to implement mail item assignments at a postal operation center, consistent with the principles of the present invention.

Referring now to FIG. 5, equipment is shown, which may be used to implement the mail item assignment at postal operation center 104. The illustrated equipment is similar to the equipment of FIG. 4, except that customer computer system 406 is replaced with a postal operations computer system 502. This equipment, like the equipment at customer facility 102, interacts with SAMS 200 via a respective computer system. SAMS 200 may thus interact with these computer systems wherever they may reside. Through this interaction, SAMS 200 performs the mail item assignments, based upon a set of routines and business rules for the location for which the SAMS software component is making the assignments. These business rules may include location priority information. For example, a higher priority may be given to the assignments of a postal processing center over a customer facility, because the postal processing center may assign mail items for multiple customers.

In one embodiment consistent with the principles of the present invention, SAMS 200 may provide dynamic business rules. These business rules are considered dynamic, because the rules may change based upon changes in the business processes. For example, business rules may change based on new contracts with transportation providers, new laws, new mail types, or new methods of conducting business with customers.

Figure 6:
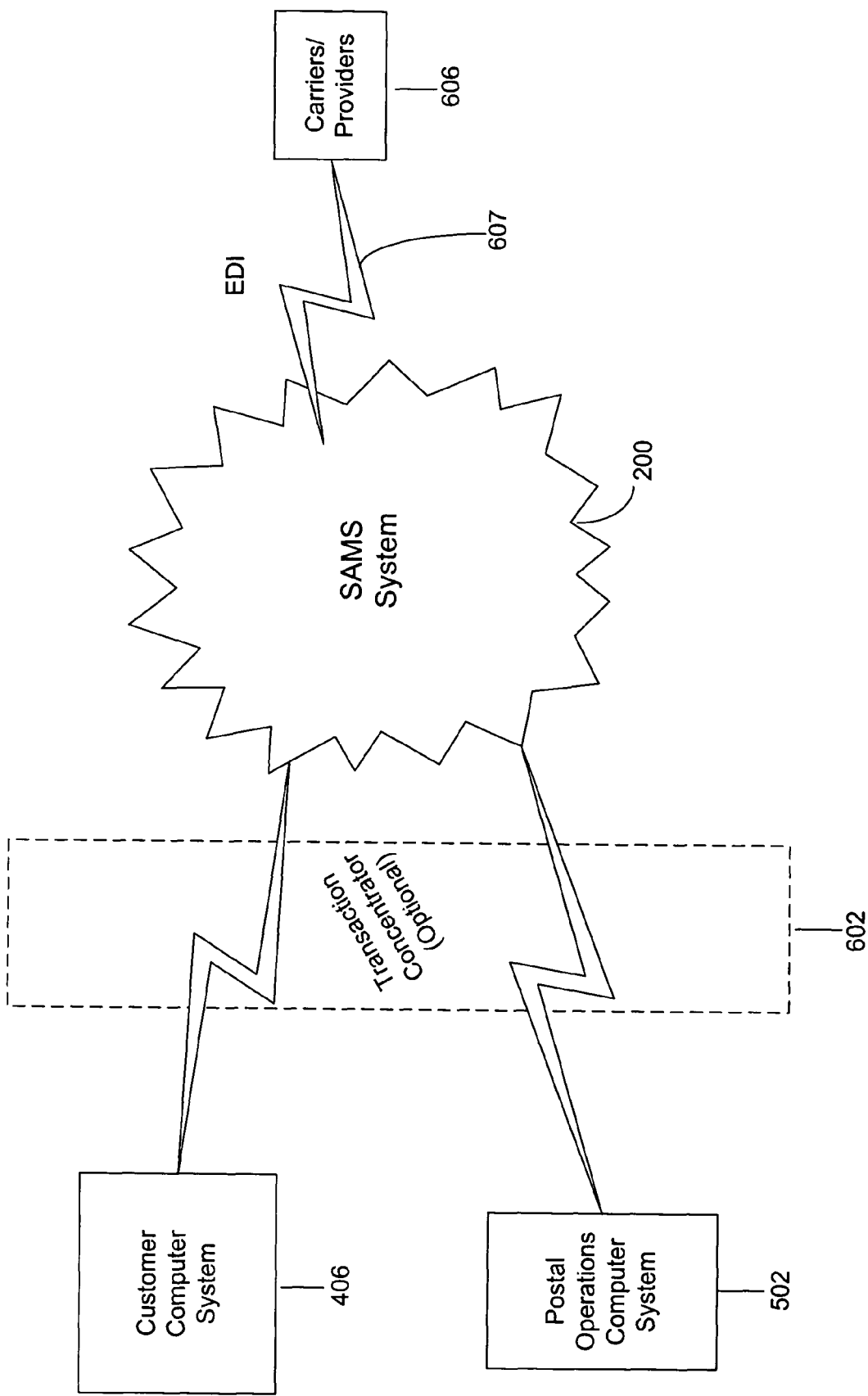
FIG. 6 provides an illustration of a communications scheme for SAMS, consistent with the principles of the present invention.

Referring now to FIG. 6, there is shown a communications scheme for SAMS 200. As FIG. 6 illustrates, customer computer system 406 and postal operations computer system 502 may interact with SAMS 200 through a Transaction Concentrator (TC) 602. TC(s) 602 may control the flow of electronic communications between Mail Processing Equipment Systems (MPES), such as customer computer system 406 and postal operations computer system 502, and SAMS 200. TC(s) 602 may monitor the assignments that are being transferred by SAMS 200 and only allow assignments meeting the assigned business rules. TC(s) 602 may also receive delivery tracking information from carriers 606, which may be used for payment of the appropriate transportation provider. TC(s) (602) may receive the tracking information from SAMS 200 via a two way communication exchange.

In one embodiment consistent with the principles of the present invention, TC(s) 602 may be a server that functions as an interface between Mail Processing Equipment Systems (MPES) and SAMS. However, in other embodiment(s) consistent with the principles of the present invention, TC(s) 602 may be implemented in software and/or hardware within SAMS 200.

Consistent with the principles of the present invention, an electronic data interchange (EDI) communications link 607 may be used to communicate with carriers or providers 606. Through communications link 607, carriers 606 may provide updated routing information to SAMS 200. The updated routing information may provide information regarding unexpected weather or capacity changes, which enable SAMS 200 to have the flexibility to re-assign mail items to different carriers. EDI communications link 607 may also allow SAMS 200 to provide feedback to carriers 606 of the assignments and re-assignment that have been made. Carrier 606 may use the assignment information to calculate and determine whether SAMS 200 is correctly balancing loads and to calculate the payment that should be receive for the transportation services.

In addition to the feedback provided to carriers 606, SAMS 200 may also provide a hard copy and/or electronic manifest indicating the assignments that have been made and the mail items that have been delivered to carriers 606. The manifest may indicate the number of pounds of mail items that have assigned to carriers 606. Carriers 606 may retain the manifest for recording purposes and to ensure that the appropriate payment is made.

Figure 7:
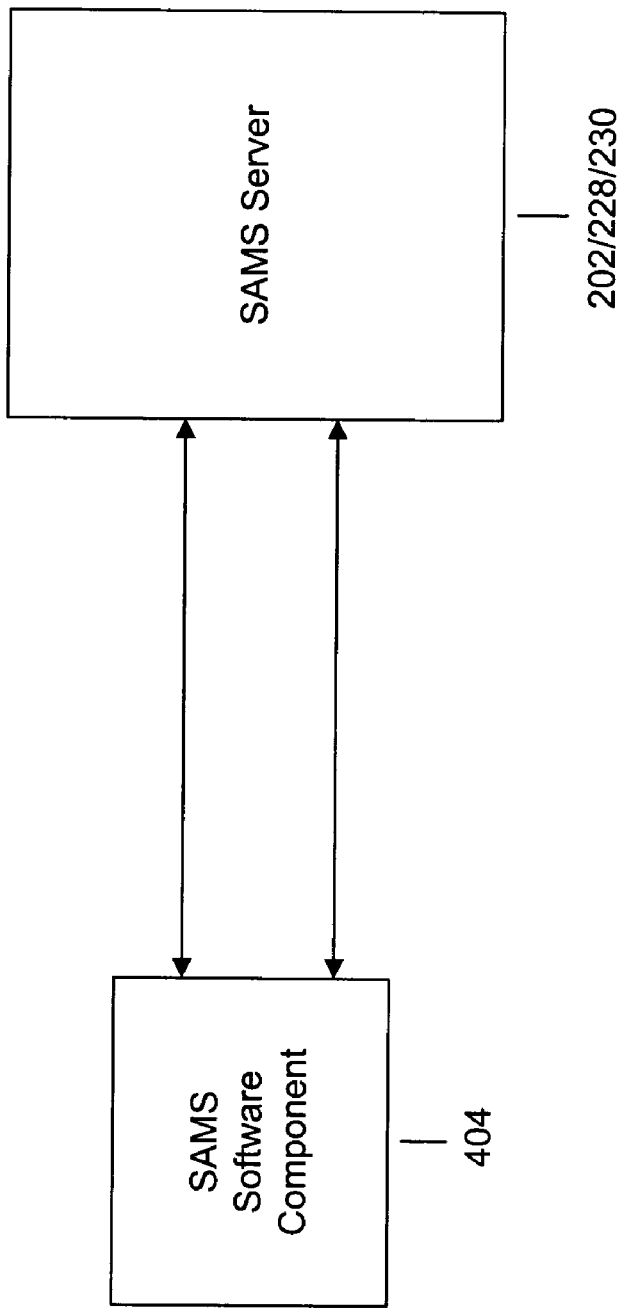
FIG. 7 provides an illustration of the interaction between the SAMS software component and SAMS, consistent with the principles of the present invention.

Referring now to FIG. 7, there is shown an interaction between SAMS software component 404 and SAMS server (202, 228, or 230), which may be one of the plurality of servers forming SAMS 200. As mentioned in conjunction with FIG. 4, SAMS software component 404 may be an electronic data component, such as a series of files and instructions that may be received from the mail item assignment equipment (e.g., scanning devices 402 (FIG. 4)). Once SAMS software component 404 receives the mail item tray information (e.g., the mail item origin, destination, and type) from the mail item assignment equipment, the information may be transferred to customer computer system 406 or postal operations computer system 502. These computer systems then transfer this information to SAMS server (202, 228, or 230).

In turn, SAMS server (202, 228, or 230) processes mail item tray information and transmits label instructions to a print routine within customer computer system 406 or postal operation computer system 502. Through the print routine, labels or DNR tags are generated, which provide instructions and bar codes for processing mail item trays downstream and identifying the transportation provider.

Through SAMS software component 404 and the associated computer system (406 or 502), SAMS 200 collects information for payment of the carriers and capacity planning. The capacity information may be used for assisting in dynamic assignment of the mail items. The capacity information is computed while the assignments are taken place to ensure that the capacity limits are not exceeded. When the capacity limit of a mode of transportation is reached, the assignments may be transferred to another mode of transportation.

Figure 8:
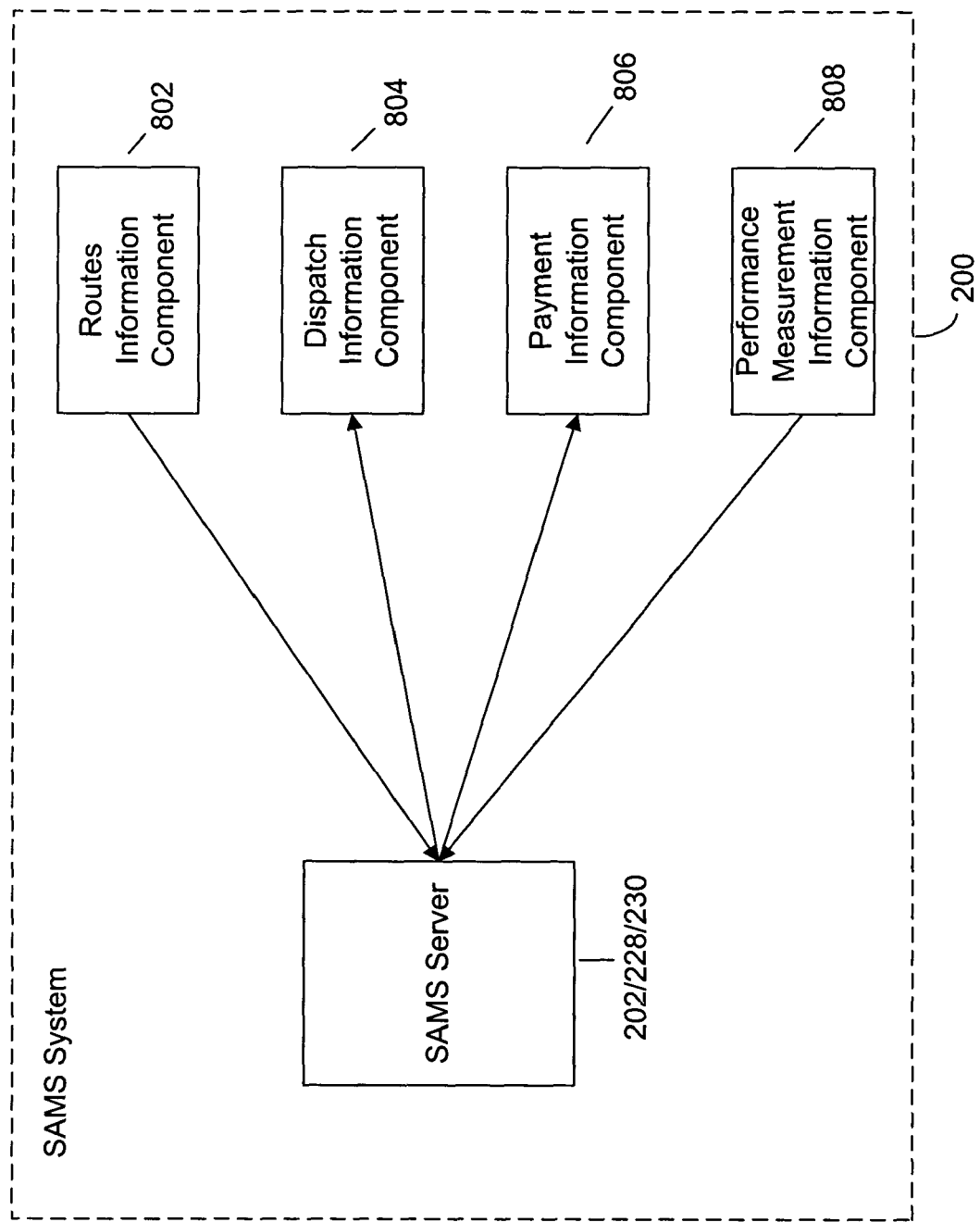
FIG. 8 provides an illustration of the information components that communicate with SAMS, consistent with the principles of the present invention.

Referring now to FIG. 8, components are shown through which SAMS 200 may send and receive information while performing mail item assignments. SAMS 200, through SAMS server (202, 228, or 230), may receive information through a routes information component 802 and a performance measurement information component 808. SAMS 200 may also transmit information through a dispatch information component 804 and a payment information component 806.

Performance measurement information component 808 receives information from devices that collect information indicating the location of a mail item tray or container during transportation. This may be accomplished by detection devices, such as scanners, that detect when the tray or container pass through logical or physical gates. When a mail item tray passes through a gate, the detection device records the activity, and SAMS 200 may measure the duration of time between two gates and/or provide a broad or narrow picture of the logical and/or physical gates to determine whether the performance objectives have been met. In other words, performance measurement information may be transmitted to SAMS 200 to hold the USPS and the carriers accountable for meeting the time constraints associated with the delivery contract. Performance measurement information may also be provided to the carriers for their internal performance monitoring, and may be used in conjunction with payment information component 806 to accurately pay the carriers and track the usage and payments over time.

Routes information component 802 collects and configures the origin to destination paths used to transport the mail items, and dispatch information component 804 selects the appropriate route to transport the mail items from point A to point B. Dispatch information component 804 selects the most efficient and timely manner to transport the mail items from city to city and balances the transport mode selection to fairly and efficiently use the various providers. Dispatch information component 804 may use a process driven by business rules that may be modified. The business rules may consider factors such as: 1) assigning surface transportation instead of air transportation, if the destination is equal to or less then a given number of miles; 2) assigning mail items to the next available flight up to cutoff time (cutoff times may be determined as the time when the transportation leaves plus the time to move the mail from the assignment facility to the airport/transportation hub, etc.); 3) giving priority to one or more carriers based on contract agreement; and/or 4) assigning mail items to the lowest cost transportation, unless contract agreements override cost rules.

Figure 9:
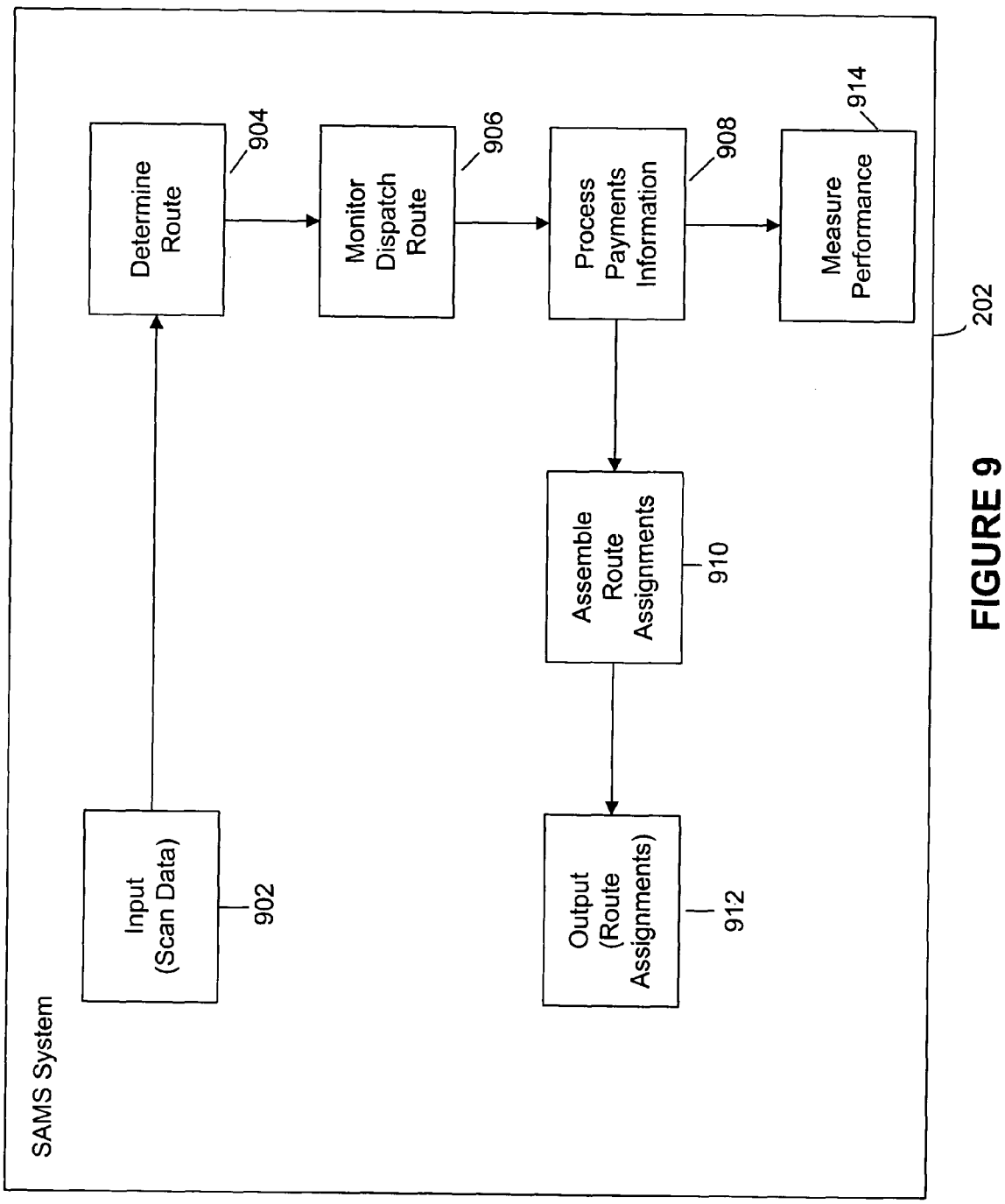
FIG. 9 provides a block diagram illustrating the stages executed by the software components of FIG. 8, consistent with the principles of the present invention.

Referring now to FIG. 9, a block diagram illustrates the stages executed by information components of FIG. 8. These stages may be executed by the information components (802-808) to accomplish and monitor the assignment process.

In an input stage of the process, the mail item trays are scanned and the captured information may be transmitted to SAMS 200 (Stage 902). Then, based on the scanned data, the appropriate route or routes may be determined (Stage 904). The route determination may involve more than one route for a mail item to reach a final destination, because the mail items may be routed through multiple cities.

Then, SAMS 200 monitors the dispatched routes and ensures that the various routes are within capacity and have not exceeded predetermined limits (Stage 906). During this process, as discussed above in conjunction with FIG. 6, through an EDI communications link, SAMS 200 may receive routine update information from the carriers. The update Information may indicate factors that negatively effect the use of a particular route, such as weather or the discontinuance of a route. As a result of the update information, SAMS 200 may reassign the mail items and changed the route to another mode of transportation.

Next, the routing data may be processed to generate the payment information. (Stage 908) SAMS 200 may process the payment information in a similar fashion to the process used by a time clock. SAMS 200 may collect the appropriate data to feed the financial systems of the USPS, so that these systems remit payments to the carriers. It is important to note that in embodiments consistent with the principals of the present invention the functionality of the financial systems may be incorporated into SAMS 200. Once the payment information is processed, the route assignments may be assembled (Stage 910) and output to customer computer system 406, postal operations computer system 502, and carriers 606 (Stage 912). The route assignments may be comprised of mail items that have been assigned to a particular route.

In addition to the above, SAMS 200 may also feed and collect information for performance measurement (Stage 914). SAMS 200 may act as a start clock for the assignment process and collect performance measurements from other systems and devices (not shown) regarding the speed and efficiency of the passage of mail items through the delivery system. SAMS 200 collects, for example, the start time of the assignment, the location of the assignment, the destination, and the mode of transportation to which the mail items are assigned. Then, throughout the delivery process, as the mail items are tracked by detection devices, the information may be fed back to SAMS 200 until a stop clock is determined at the final destination.

Figure 10:
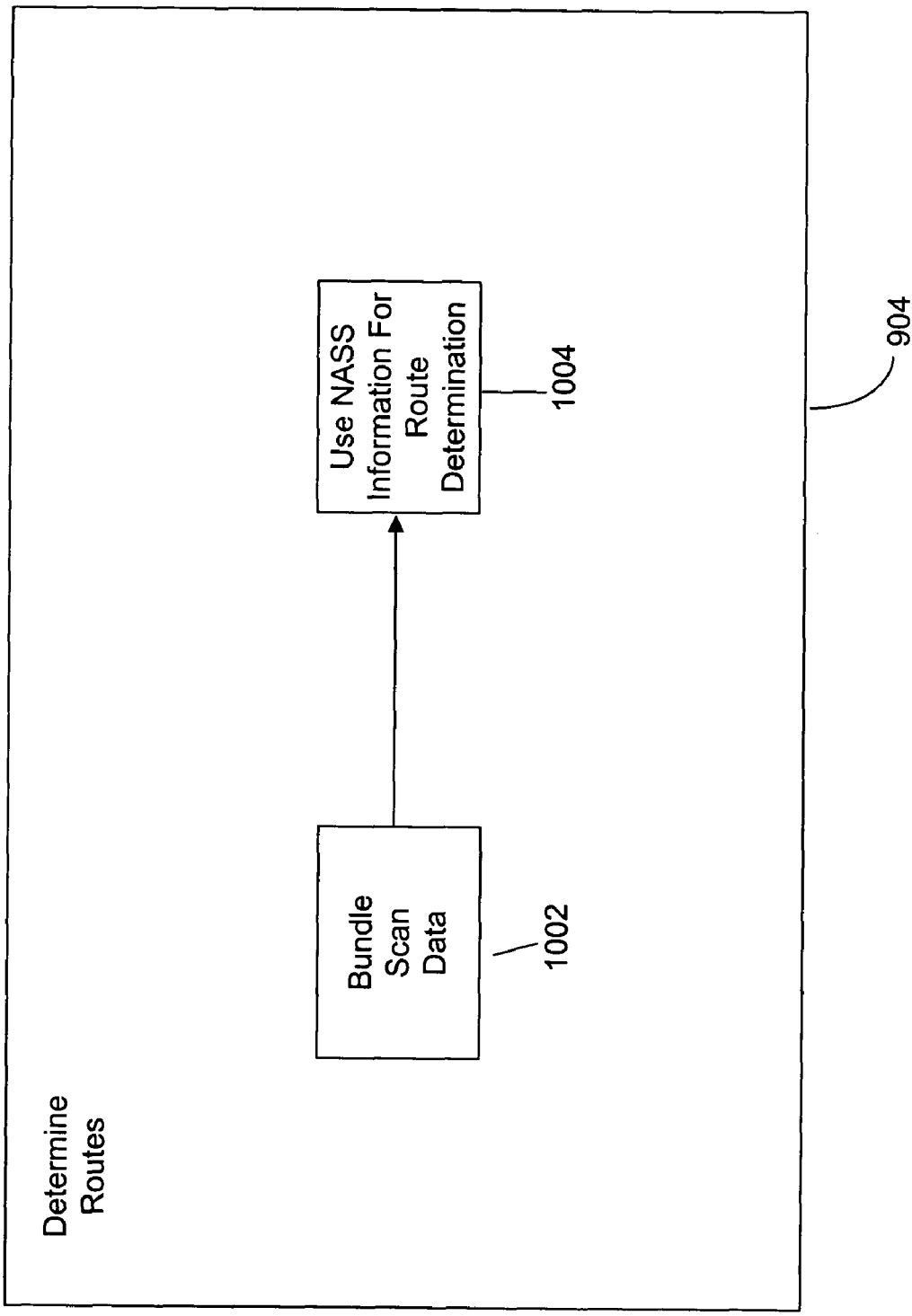
FIG. 10 provides further information regarding the route determining stage discussed in conjunction with FIG. 9, consistent with the principles of the present invention.

Referring now to FIG. 10, additional information is shown regarding the route determining stage discussed in conjunction with FIG. 9. In stage 1002, the scan data may be bundled and provided to SAMS 200. SAMS 200, in turn, may use the National Air and Surface System (NASS) database to arrive at the route determination (Stage 1004). NASS may be the source for authorized dispatch and routing information. USPS area Office Distribution Networks (DN) managers may be responsible for maintaining the dispatch and routing information in the NASS database. The NASS database may provide the details of each individual route that the postal service may use for delivery and may be updated using various sources, such as the airline guide, which updates the core data of the air carriers and the capacity that may be assign to the carriers. It is important to note that in embodiments consistent with the principles of the present invention the functionality of the NASS database may be incorporated into SAMS 200.

Figure 11:
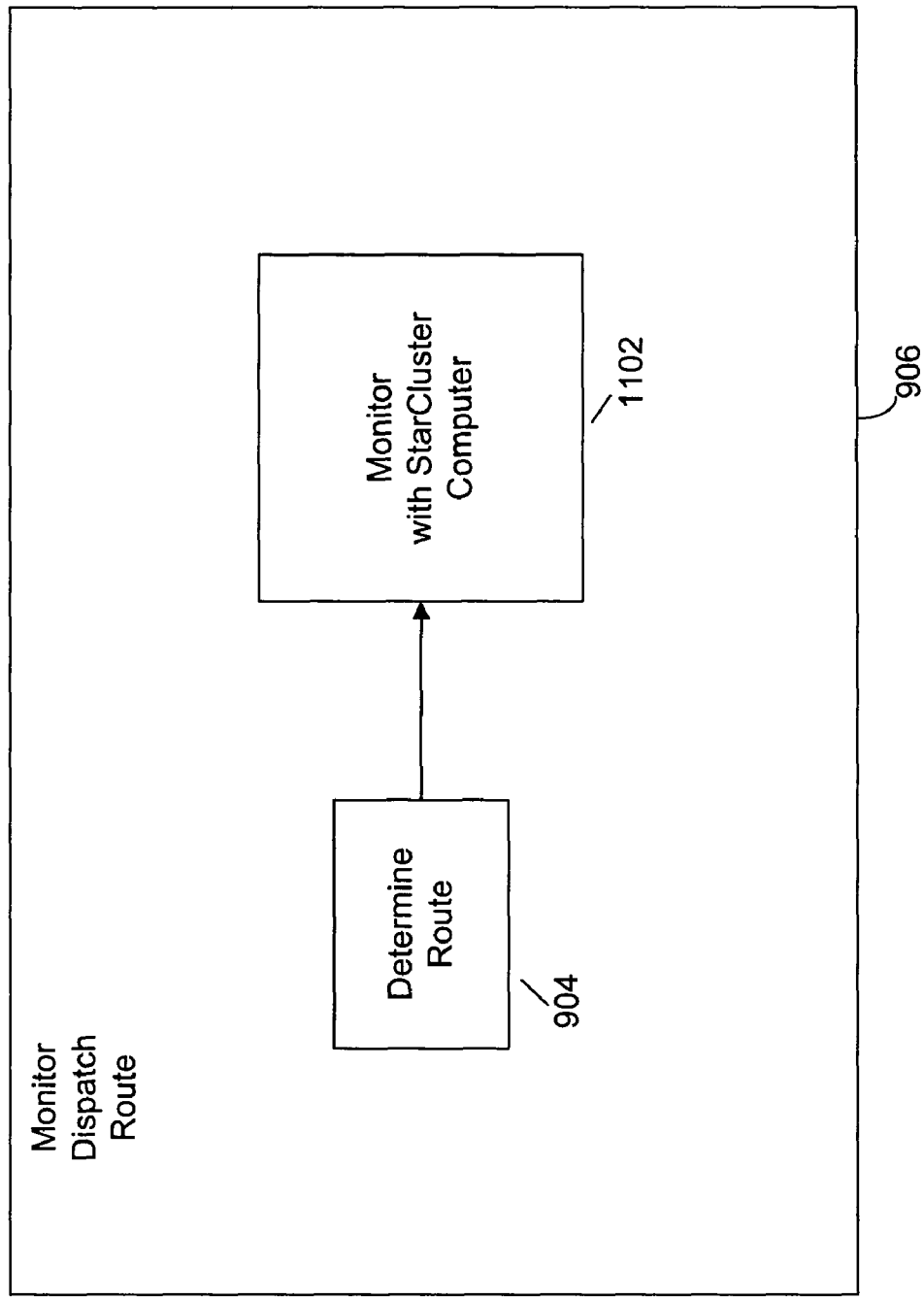
FIG. 11 provides further information regarding the monitor dispatch route stage of FIG. 9, consistent with the principles of the present invention.

Referring now to FIG. 11, additional information is shown regarding the monitor dispatch route stage (Stage 906) of FIG. 9. In addition to the capabilities discuss above in conjunction to FIG. 9, SAMS 200 monitors assignment performance with the StarCluster computer (Stage 1102). The Star Cluster computer may be a USPS application that gathers data from mail processing equipment and may be used for reporting purposes. Most, if not all of the functionality of the Star Cluster computer, may be integrated into SAMS 200.

The StarCluster computer may monitor and track assignment performance through hardcopy and electronic reports that may be provided to managers and dispatch personnel. Through these reports, the assignment performance may be analyzed to determine the performance of any facility. For example, a facility may be evaluated by city pairs to determine whether the dispatch and assignment times, for the various types of mail items, were met for a designated period of time.

Figure 12:
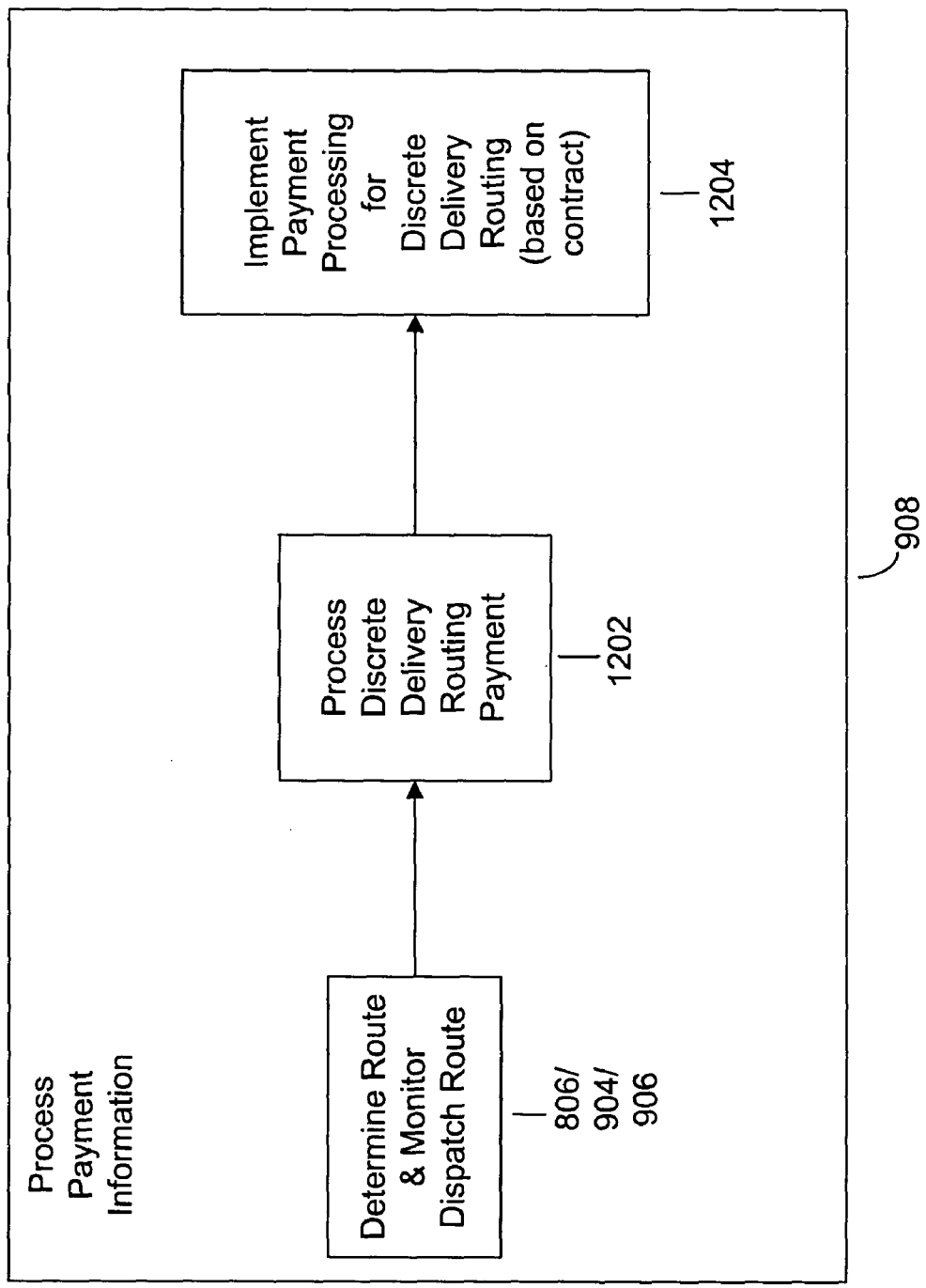
FIG. 12 provides further information regarding the process payment Information stage of FIG. 9, consistent with the principles of the present invention.

Referring now to FIG. 12, additional information is shown regarding the process payment Information stage (Stage 908) of FIG. 9. After the route determination and the monitoring of the dispatch route stage (Stages 904 and 906), the routing information is fed into a discrete delivery routing payment process (Stage 1202). Then, in Stage 1204, the payment processing for discrete delivery routing may be implemented, base on the contract information and a number of business rules. The contract information may be different depending on the mode of transportation. For example, airline contracts may be paid on a per pound basis, while tractor trailer providers may be paid a fixed price independent of the amount of mail items carried. Furthermore, the amount paid to each provider within a mode of transportation may also be different. The business rules will be described below.

Figure 13:
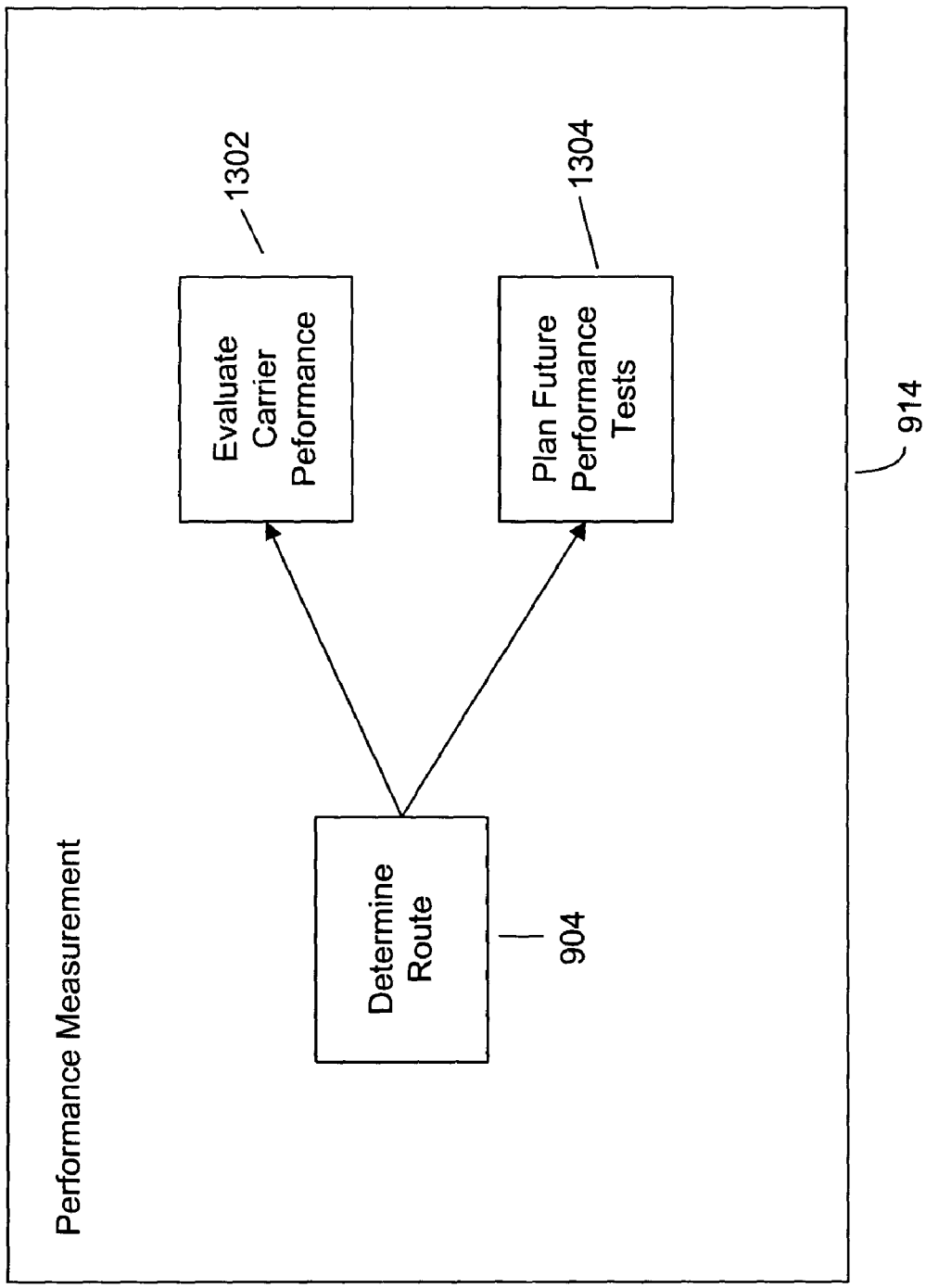
FIG. 13 provides further information regarding the performance measurement stage of FIG. 9, consistent with the principles of the present invention.

Referring now to FIG. 13, additional information is shown regarding the performance measurement stage (Stage 914) of FIG. 9. In the route determination stage (Stage 904), SAMS 200 monitors the carriers' performance using the methods previously described in conjunction with FIG. 8 (Stage 1302). Based on the carriers' current performance information, SAMS 200 and/or USPS personnel may anticipate future performance tests that may be necessary to monitor the performance of the carriers (Stage 1304). Therefore, the performance tests may change overtime, and new rules and forecasting may be developed to monitor future performance.

Figure 14:
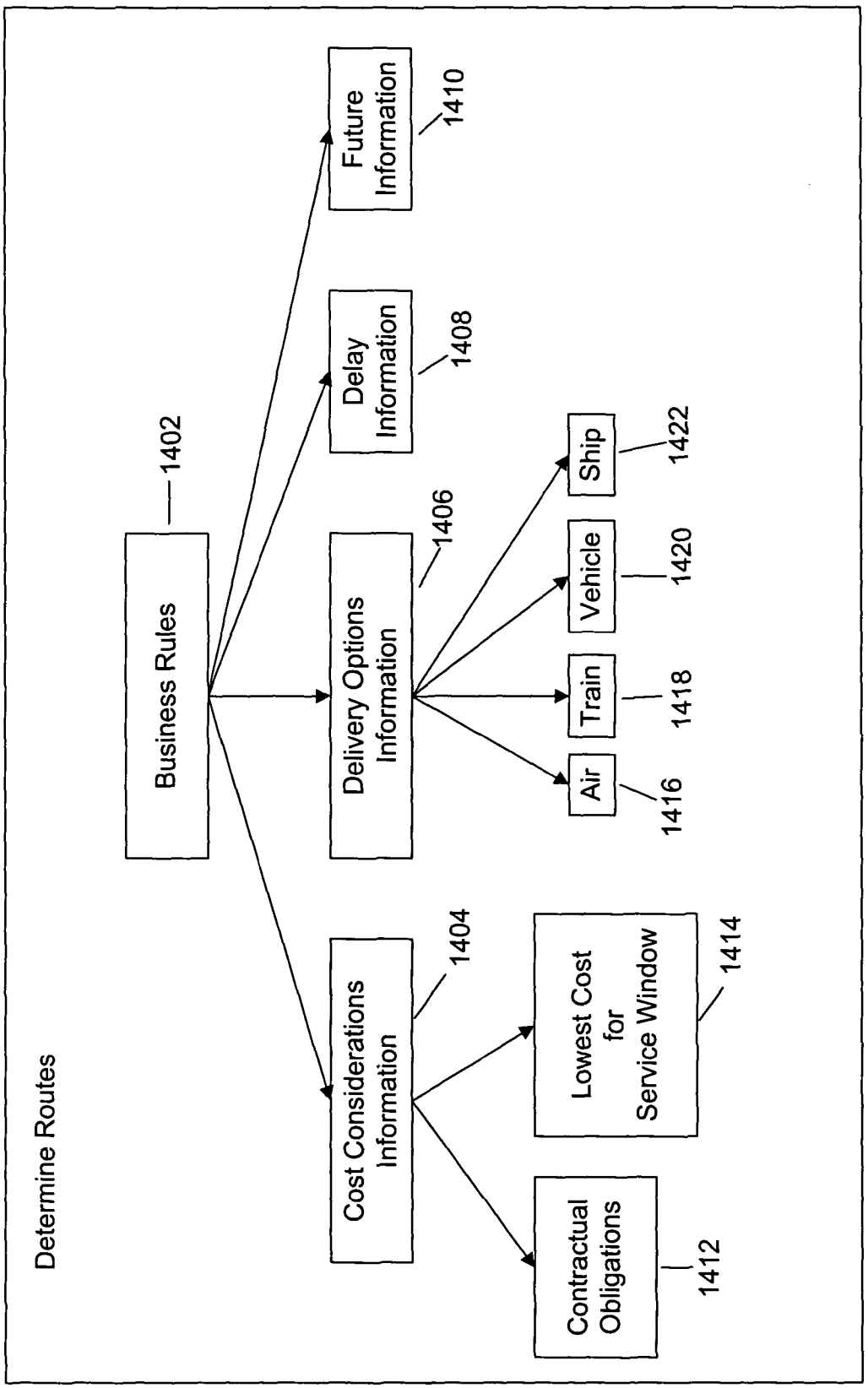
FIG. 14 provides further information regarding the determine route stage of FIG. 9, consistent with the principles of the present invention.

Referring now to FIG. 14, additional information is shown regarding the determine route stage (Stage 904) of FIGS. 9 and 10. In the determine route stage, business rules 1402 may be applied to determined the appropriate mail assignment. Business rules 1402 may take into account a number of factors, such as cost considerations information 1404, delivery options information 1406, delay information 1408, and future information 1410. These factors may be compared and weighed, along with the additional sub-factors discussed below, to determine the mail assignments.

Cost considerations information 1404 may further take into account factors such as contractual obligations 1412 and lowest cost for service window 1414. Contractual obligations 1412 may determine and apply federal rules governing the assignment of mail items to the various carriers. For example, in a particular state, federal rules may mandate that the mail assignments must be shared among many carriers regardless of cost. Lowest cost for service window 1414 may determine the lowest cost carrier that is projected to meet the delivery requirements.

Delivery options information 1406 may further evaluate the various carrier options, such as air 1416, train 1418, vehicle 1420, and ship 1422. These carrier options may be weighed and compared to determine the appropriate carrier for the assignment, based on factors such as the reliability of the carrier, delays in route (e.g., weather or cancellation of route), and cost of delivery. Delay information 1408, which may be used as one of the factors in evaluating the carriers, may be fed to SAMS 200 via EDI communications from the various carriers and other information sources (e.g., The National Weather Service).

In FIG. 14, future information 1410 may represent additional business rules that may be incorporated into the determine route stage, as business needs dictate. For example, in Alaska, a different set of business rules may be incorporated to assign the mail items to bush pilots in such a manner that the pilots are not placed at risk due to, for example, overloading and/or flying in bad weather.

Method of Operation

Figure 15:
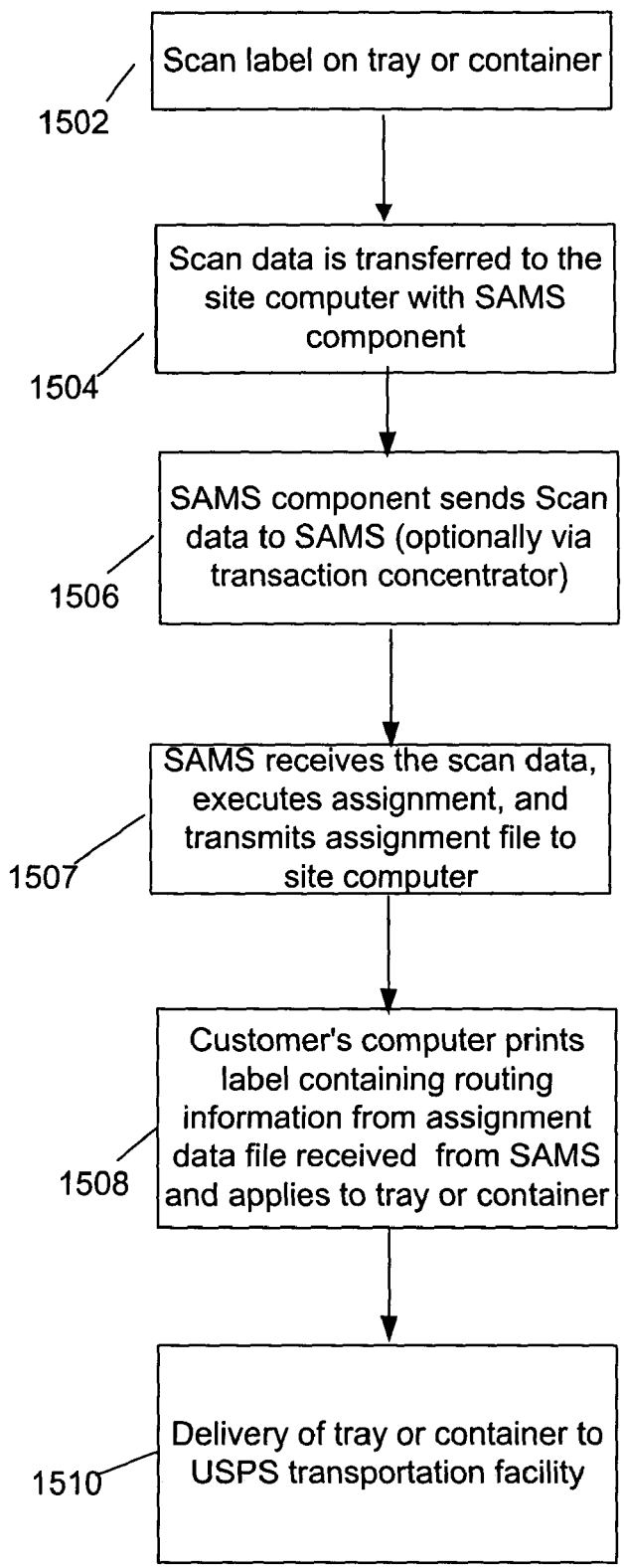
FIG. 15 provides a flowchart illustrating the stages for accomplishing mail item assignments between a customer site and SAMS, consistent with the principles of the present invention.

Consistent with the principles of the present invention, FIG. 15 provides a flowchart illustrating the interaction between a remote site and SAMS 200 for accomplishing mail item assignments. In a first stage, the labels on the trays or containers (Stage 1502) may be scanned. These labels may be created through normal processing in a print routine that may be built into the site's mail processing operation. The scan data may be transferred to a site computer (Stage 1504). In the site computer, SAMS software component 404 sends the scan data to SAMS 200. The scan data may be sent to SAMS 200 through the hardware/software of an optional transaction concentrator 602 (Stage 1506). SAMS 200 receives the scan data, executes an assignment, and transmits an assignment data file to the site computer (Stage 1507).

Next, the site computer prints the labels or DNR tags containing the routing information from the assignment data file received from SAMS 200, which may then be applied to a tray or container (Stage 1508). The assignment data file may contain a set of instructions, which may include a print file routine for enabling the printing of a set of tags associated with the various mail types. Once the DNR tags are applied to the trays or containers, the trays or containers may be delivered directly to the USPS transportation facility (Stage 1510).

Figure 16:
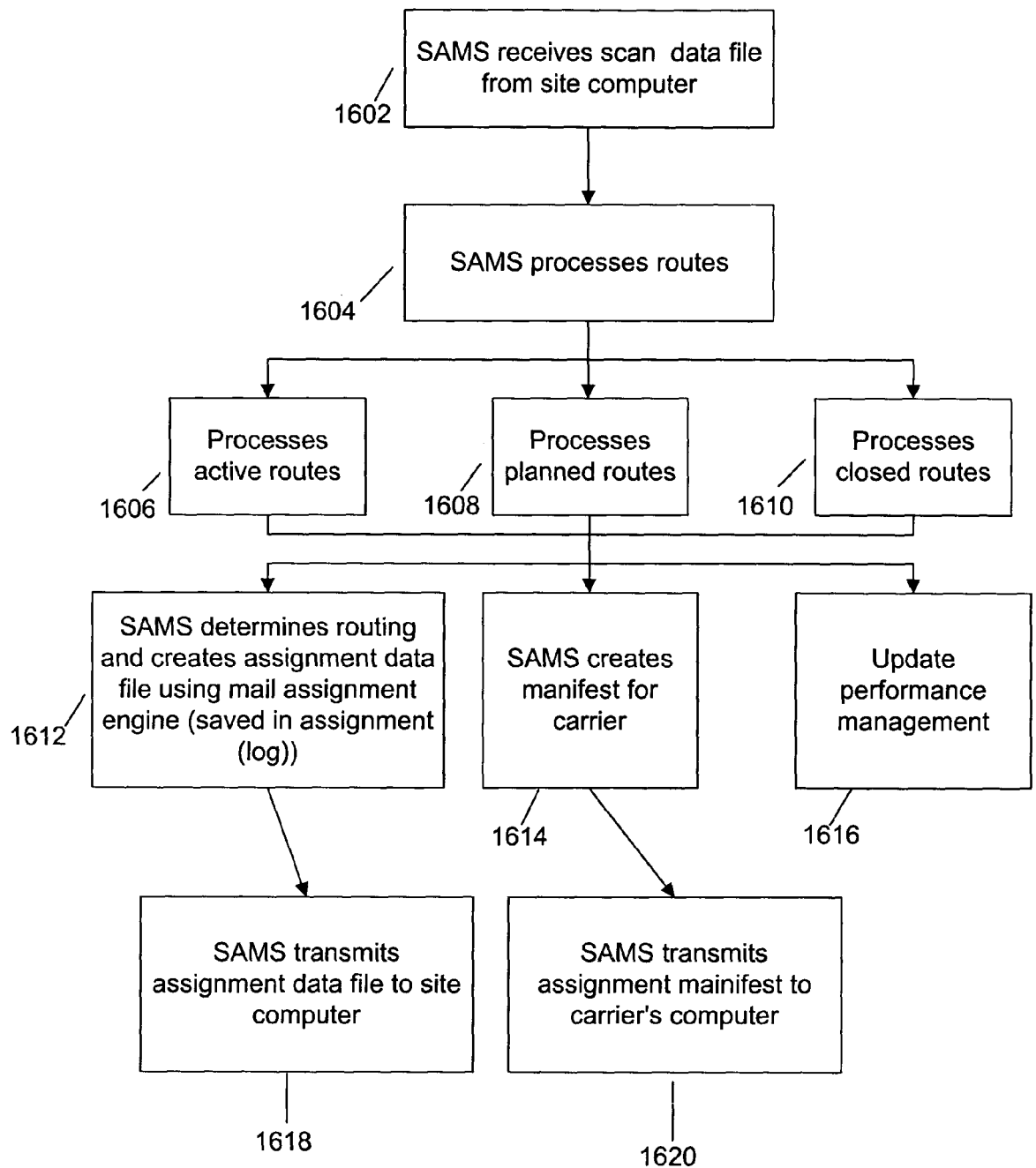
FIG. 16 provides a flowchart illustrating the stages that SAMS executes to accomplish a mail assignment, consistent with the principles of the present invention.

Consistent with the principles of the present invention, FIG. 16 provides a flowchart illustrating the stages SAMS 200 may execute to accomplish a mail assignment. In a first stage, SAMS 200 may receive the scan data file from the site computer and process the route (Stages 1602 and 1604) for delivery. In processing the route, SAMS 200 may assign mail items to transportation using a table of planned routes (not shown). SAMS 200 may process active, closed, and planned routes (Stage 1606-1610) and provide the resulting information to the following stages for real-time mail assignment and reporting (e.g., manifest, performance measurement, and data feeds to payment engine and carriers). Based on business rules, a planned route may be processed to become an active route, while mail is being assigned, and a closed route once the limits (e.g., timeframe, capacity, etc.) have been reached.

At stage 1612, the processed route information is received and SAMS 200 may determine the route and create an assignment data file using the mail assignment engine 204 (FIG. 2). Once the assignment data file is saved, the route for the particular delivery may be closed. Then, SAMS 200 transmits the assignment data file to the site computer (Stage 1618). The site computer may be located at a USPS mail processing facility or at a customer's or competitor's facility. The routing information may also be used to create either an electronic or hardcopy manifest that may be provided to the carrier (Stage 1614 and 1620).

In addition to the above, the routing information may be used for performance management during the mail item delivery process (Stage 1616). The time the mail item is assigned for shipment may be defined as the "start clock" for the process. From the "start clock", the progress of the mail items from origin to destination may be tracked through the system by the USPS or the carrier.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented using a distributed computer system, of managing delivery carriers, comprising:
    receiving a first set of delivery data from a first mail processor at a first computer of the distributed computer system;
    receiving a second set of delivery data from a second mail processor at a second computer of the distributed computer system;
    determining, using the distributed computer system, routes for delivery for the first mail processor based on a first set of business rules applied to the first set of delivery data;
    determining, using the distributed computer system, routes for delivery for the second mail processor based on a second set of business rules applied to the second set of delivery data;
    assigning, using the distributed computer system, mail items to delivery carriers based on the determined routes;
    transmitting, using the distributed computer system, mail item assignment information to the first mail processor and the second mail processor;
    monitoring the determined routes, wherein monitoring includes:
        receiving update information from the delivery carriers while the mail items are being delivered on the determined routes, wherein the update information relates to at least one of the routes for delivery and a capacity of the delivery carriers; and
    dynamically reassigning the mail items to different delivery carriers based on the update information received from the delivery carriers during monitoring.

2. The method of claim 1, wherein determining routes includes processing active, planned, and closed routes.

3. The method of claim 1, wherein the first set of business rules comprise cost consideration information.

4. The method of claim 3, wherein cost consideration information includes overriding a lower cost option due to a carrier contract obligation.

5. The method of claim 3, wherein cost consideration information includes determining a lowest cost for service window.

6. The method of claim 3, wherein cost considerations information includes delivery option information.

7. The method of claim 6, wherein delivery option information includes evaluating data regarding a combination of at least one aircraft, at least one train, at least one motor vehicle, or at least one ship, as a means of transporting the mail items.

8. The method of claim 3, wherein the first set of business rules further comprise using route delay information.

9. The method of claim 8, wherein using route delay information further includes receiving weather information.

10. The method of claim 8, wherein using route delay information further includes receiving route closing information from the delivery carriers.

11. The method of claim 1, further comprising creating an assignment manifest.

12. The method of claim 11, wherein creating the assignment manifest includes generating one of a hardcopy and an electronic copy of the assignment manifest.

13. The method of claim 12, further comprising transmitting the assignment manifest to at least one delivery carrier.

14. The method of claim 1, further comprising tracking deliveries of the mail items using performance management tools.

15. The method of claim 1, further comprising:
    measuring the performance of the delivery carriers; and
    adjusting at least one business rule based on the measured performance information.

16. A distributed computer system for managing delivery carriers, comprising:
    means for receiving a first set of delivery data from a first mail processor at a first computer of the distributed computer system;
    means for receiving a second set of delivery data from a second mail processor at a second computer of the distributed computer system;
    means for determining routes for delivery, using the first computer, based on a first set of business rules applied to the first set of delivery data;
    means for determining routes for delivery, using the second computer, based on a second set of business rules applied to the second set of delivery data;
    means for assigning mail items to delivery carriers based on the determined routes;
    means for transmitting mail item assignment information to the first mail processor and the second mail processor;
    means for monitoring the determined routes, wherein monitoring includes:
        receiving update information from the delivery carriers while the mail items are being delivered on the determined routes, wherein the update information relates to at least one of the routes for delivery and a capacity of the delivery carriers; and
    means for dynamically reassigning the mail items to different delivery carriers based on the update information received from the delivery carriers during monitoring.

17. The system of claim 16, wherein the means for determining routes includes means for processing active, planned, and closed routes.

18. The system of claim 16, wherein the first set of business rules comprise cost consideration information.

19. The system of claim 18, wherein cost consideration information includes overriding a lower cost option due to a carrier contract obligation.

20. The system of claim 18, wherein the cost consideration information further includes determining a lowest cost for service window.

21. The system of claim 18, wherein the cost consideration information includes delivery option information.

22. The system of claim 21, wherein the delivery option information includes evaluating data regarding a combination of at least one aircraft, at least one train, at least one motor vehicle, or at least one ship, for transporting the mail items.

23. The system of claim 18, wherein the first set of business rules further comprise route delay information.

24. The system of claim 23, wherein the route delay information further includes overriding a route choice after receiving weather information.

25. The system of claim 23, wherein the route delay information further includes overriding a route choice after receiving route closing information from the delivery carriers.

26. The system of claim 16, further comprising means for creating an assignment manifest.

27. The system of claim 26, wherein the means for creating the assignment manifest includes means for generating one of a hardcopy and an electronic copy of the assignment manifest.

28. The system of claim 27, further comprising means for transmitting the assignment manifest to at least one delivery carrier.

29. The system of claim 16, further comprising means for tracking deliveries of the mail items.

30. The system of claim 16, further comprising:
means for measuring the performance of the delivery carriers; and
means for adjusting at least one business rule based on the measured performance information.

31. A solid computer-readable medium having computer-executable instructions for performing stages, comprising:
receiving a first set of delivery data from a first mail processor;
receiving a second set of delivery data from a second mail processor;
determining routes for delivery for the first mail processor based on a first set of business rules applied to the first set of delivery data;
determining routes for delivery for the second mail processor based on a second set of business rules applied to the second set of delivery data;
assigning mail items to delivery carriers based on the determined routes;
transmitting mail item assignment information to the first mail processor and the second mail processor;
monitoring the determined routes, wherein monitoring includes:
receiving update information from the delivery carriers while the mail items are being delivered on the determined routes, wherein the update information relates to at least one of the routes for delivery and a capacity of the delivery carriers; and
dynamically reassigning the mail items to different delivery carriers based on the update information received from the delivery carriers during monitoring.

32. The computer-readable medium of claim 31, wherein determining routes includes processing active, planned, and closed routes.

33. The computer-readable medium of claim 31, wherein the first set of business rules comprise using cost consideration information.

34. The computer-readable medium of claim 33, wherein using cost consideration information includes overriding a lower cost option due to a carrier contract obligation.

35. The computer-readable medium of claim 33, wherein using cost consideration information includes determining a lowest cost for service window.

36. The computer-readable medium of claim 33, wherein using cost consideration information includes using delivery option information.

37. The computer-readable medium of claim 36, wherein using delivery option information includes evaluating data regarding a combination of at least one aircraft, at least one train, at least one motor vehicle, or at least one ship, as a means of transporting the mail items.

38. The computer-readable medium of claim 33, wherein the first set of business rules further comprise using route delay information.

39. The computer-readable medium of claim 38, wherein using route delay information further includes receiving weather information.

40. The computer-readable medium of claim 38, wherein using route delay information further includes receiving route closing information from the delivery carriers.

41. The computer-readable medium of claim 31, further comprising computer-executable instructions for creating an assignment manifest.

42. The computer-readable medium of claim 31, wherein creating the assignment manifest includes generating one of a hardcopy and an electronic copy of the assignment manifest.

43. The computer-readable medium of claim 42, further comprising computer-executable instructions for transmitting the assignment manifest to at least one delivery carrier.

44. The computer-readable medium of claim 31, further comprising computer-executable instructions for tracking deliveries of the mail items.

45. The computer-readable medium of claim 31, further comprising:
measuring the performance of the delivery carriers; and
instructions for performing a stage comprising adjusting at least one business rule based on the measured performance information.

46. A distributed system for managing delivery carriers, comprising:
at least one server containing a mail assignment engine, the mail assignment engine operative to:
receive a first set of delivery data from a first mail processor;
receive a second set of delivery data from a second mail processor;
determine routes for delivery for the first mail processor based on a first set of business rules applied to the first set of delivery data;
determine routes for delivery for the second mail processor based on a second set of business rules applied to the second set of delivery data;
assign mail items to carriers based on the determined routes;
transmit mail item assignment information to the first mail processor and the second mail processor;
monitor the determined routes, wherein monitoring includes:
receiving update information from the delivery carriers while the mail items are being delivered on the predetermined routes, wherein the update information relates to at least one of the routes for delivery and a capacity of the delivery carriers; and
dynamically reassign the mail items to different delivery carriers based on the update information received from the delivery carriers during monitoring.

47. The system of claim 46, wherein a transaction concentrator is used to manage communications for the at least one server.

48. The system of claim 46, wherein the mail assignment engine determines the routes using a database including files for active, planned, and closed routes.

49. The system of claim 46, wherein the first set of business rules comprise cost consideration information.

50. The system of claim 49, wherein the cost consideration information includes overriding a lower cost option due to a carrier contract obligation.

51. The system of claim 49, wherein the cost consideration information includes a lowest cost for service window.

52. The system of claim 49, wherein the cost consideration information includes delivery option information.

53. The system of claim 52, wherein the delivery option information includes information for evaluating data regarding a combination of at least one aircraft, at least one train, at least one motor vehicle, or at least one ship.

54. The system of claim 49, wherein the first set of business rules further comprise route delay information.

55. The system of claim 54, wherein the route delay information further includes weather information.

56. The system of claim 54, wherein the route delay information further includes route closing information received from the delivery carriers.

57. The system of claim 46, wherein the mail assignment engine is further operative to create an assignment manifest.

58. The system of claim 57, wherein the assignment manifest is one of a hardcopy and an electronic file for delivery to at least one of the delivery carriers.

59. The system of claim 46, further comprising performance management tools for tracking deliveries of the mail items.

60. The system of claim 46, wherein the mail assignment engine is operative to:
   receive performance measurements of carriers; and
   adjust at least one business rule based on the performance measurements.

61. A system for tagging mail items, comprising:
   a first computer for executing a first software component, the first software component including computer-executable instructions for:
      receiving a first set of delivery data;
      transmitting the first set of delivery data to a mail item assignment system;
      receiving mail item assignment information from the mail item assignment system after the mail item assignment system assigns a first set of mail items to a delivery carrier and an associated delivery route, wherein the assignment is based on a first set of business rules applied to the first set of delivery data;
      receiving information indicating reassignment of the first set of mail items after the mail item assignment system dynamically reassigns the first set of mail items to a different delivery carrier based on monitoring the delivery route after the first set of mail items are assigned to the delivery route, wherein monitoring includes receiving update information from the previously assigned delivery carrier while the first set of mail items are being delivered on the assigned delivery route, the update information including information concerning at least one of a previously assigned delivery route and a capacity of the previously assigned delivery carrier; and
      printing labels containing mail item routing information; and
   a second computer for executing a second software component, the second software component including computer-executable instructions for:
      receiving a second set of delivery data;
      transmitting the second set of delivery data to the mail item assignment system;
      receiving mail item assignment information from the mail item assignment system after the mail item assignment system assigns a second set of mail items to a delivery carrier and an associated delivery route, wherein the assignment is based on a second set of business rules applied to the second set of delivery data;
      receiving information indicating reassignment of the second set of mail items after the mail item assignment system dynamically reassigns the second set of mail items to a different delivery carrier based on monitoring the delivery route after the second set of mail items are assigned to the delivery route, wherein monitoring includes receiving update information from the previously assigned delivery carrier while the second set of mail items are being delivered on the assigned delivery route, the update information including information concerning at least one of a previously assigned delivery route and a capacity of the previously assigned delivery carrier; and
      printing labels containing mail item routing information.

* * * * *